United States Patent [19]
Weingrad

[11] 3,967,021

[45] June 29, 1976

[54] DECALCOMANIAS EMPLOYED IN OFFSET TRANSFER PROCESS

[75] Inventor: Saul W. Weingrad, Hillsdale, N.J.

[73] Assignee: Pictorial Productions, Inc., Mount Vernon, N.Y.

[22] Filed: Feb. 12, 1973

[21] Appl. No.: 331,564

Related U.S. Application Data

[62] Division of Ser. No. 139,044, April 30, 1971, abandoned.

[52] U.S. Cl. .................................. 428/40; 156/230; 427/148; 428/346; 428/914

[51] Int. Cl.² ......................... B44C 3/12; B32B 7/06

[58] Field of Search ........... 161/167, 406 T; 156/89, 156/235, 240, 234; 117/3.1, 3.2, 3.6, 72, 68.5; 101/33, 34, 44, 45; 167/406; 427/146, 147, 148, 152; 428/346, 40, 348

[56] References Cited

UNITED STATES PATENTS

| | | | |
|---|---|---|---|
| 1,968,394 | 7/1934 | Hepp | 428/914 |
| 2,190,210 | 2/1940 | Kaber | 117/3.6 |
| 2,235,514 | 3/1941 | Brown | 428/914 |
| 2,970,076 | 1/1961 | Porth | 156/89 |
| 3,007,829 | 11/1961 | Akkeron | 156/89 |
| 3,025,167 | 3/1962 | Butler | 117/122 H |
| 3,255,695 | 6/1966 | Johnson et al. | 117/38 |
| 3,344,012 | 9/1967 | Strom | 156/240 |
| 3,350,253 | 10/1967 | Goodhart | 156/230 |
| 3,445,309 | 5/1969 | Milliken | 156/89 |
| 3,459,626 | 8/1969 | Morgan | 428/914 |
| 3,554,836 | 1/1971 | Steindorf | 156/240 |
| 3,607,525 | 9/1971 | Strom | 161/406 T |
| 3,655,496 | 4/1972 | Ettre | 161/406 T |
| 3,688,695 | 9/1972 | James | 101/44 |

*Primary Examiner*—Harold Ansher
*Assistant Examiner*—R. J. Roche
*Attorney, Agent, or Firm*—Lerner, David, Littenberg & Samuel

[57] ABSTRACT

A process is provided herewith for the automatic transfer of a printed design from a printed substrate to a ceramic ware by an offset printing technique. A printed design of one or more colors is transferred to a deformable head and thereafter to the ware. The transferred design includes selectively adhesive materials making the transfer possible.

3 Claims, 7 Drawing Figures

DECALCOMANIAS EMPLOYED IN OFFSET TRANSFER PROCESS

This is a division, of application Ser. No. 139,044 filed Apr. 30, 1971, now abandoned.

BACKGROUND OF INVENTION

The decoration of ceramic ware has normally been accomplished in the art by the use of decalcomanias. These decalcomanias, or decals, are normally prepared by laying down the desired design in the form of a mixture of metallic oxide color materials and a vitrifiable flux on a decal backing sheet of a specially prepared paper which has been coated with a water soluble material, such as a gum, using either lithographic or silk screen printing techniques. Using modern registration techniques any number of colors may be deposited to form intricate designs with various degrees of shading and the like. The decals normally have a lacquer coating as the upper surface and various color layers are applied in a lacquer medium so that when finished they represent a self-supporting structure. Thus, softening the water soluble layer in water permits their transfer from the carrying paper to the ware where they are fixed by normal ceramic techniques.

There are also methods of decorating ceramics by the use of a deformable head which picks up color that has been inked onto a flat plate or roller, in other cases picks up ceramic ink that has been deposited onto an etched plate and transfers this single color onto a piece of ware. These techniques can put a design onto any portion of the plate, but can only print a single color. If more than a one color design is to be made in this method they must be done in separate operations and registered, one color to the other. This procedure is quite difficult and costly. On most of the better ware where more than one color is deposited, hand painting is used to fill in the one color printed areas to give the desired effect.

The method of this invention provides no limitation to the number of colors, and our registration is accomplished on a flat sheet of paper printed on conventional printed presses allowing for the greatest registration possible and tonal effects which cannot be produced by the aforementioned methods. In addition, such multicolor decals and prints being made presently cannot conform to every area of the plate that one would wish to have decorated, because in trying to fit a tissue print or even a heavy lacquer film required to carry the design on a conventional decal onto some of the surfaces of a curved piece of ware, a great deal of difficulty is encountered including creases and distortion of the prints, and in many cases poor firing results. With the present process one may accomplish something which has never been done before; to put a multicolored print that has been printed to its highest degree of accuracy and beauty onto any area of the ware.

BRIEF STATEMENT OF INVENTION

The process of this invention relates to the art of decoration of ceramic ware in which a decorative design is transferred automatically from a substrate on which it has been laid down to ceramic ware by the use of a transfer medium which comprises a deformable head of a material which is capable of removing the design from its substrate and depositing it on the ware without loss of detail or design fidelity. The ware with its decorative design in position is then treated in accordance with known techniques to affix it permanently thereto. The process is made possible by the unique laminar design of the decalcomania as will be hereinafter more specifically described.

DETAILED DESCRIPTION OF THE INVENTION

Decalcomania

The decorative design or decalcomania, which is to be laid down — or offset printed — on the ware comprises, in general, one or more ceramic "colors" — or mixtures of a metallic oxide with a flux composition — in a suitable vehicle, or binding composition. The colors are laid down on a substrate by preferably a silk screening technique to form the desired total design. The substrate, a sheet of supporting material, is treated prior to the application of the design with a material which has the function of holding the design in place and yet releasing it completely during the transfer step. This may be brought about by the use of an adhesive coefficient, with a heat sensitive agent, that is an agent which becomes less adhesive with temperature, and the like.

The design may similarly be coated with a medium to aid in the transfer. For example, an adhesive or heat sensitive formulation which is more highly cohesive to the material of the tranfer head than to the design substrate, but less than to the ware, would facilitate the transfer.

THE TRANSFER HEAD

An important element in the process of the invention is the transfer head or offset device which picks up the design from its substrate and deposits it on the ware.

The transfer head is constructed of a deformable material such that it may be made to conform to the shape of the ware being printed and to reproduce the design thereon with the required degree of fidelity. The transfer surface is preferably of a material such as ordinary rubber, either synthetic or natural, silicone rubber, gelatine, and the like, that is a material which is deformable and which does not absorb or adsorb the design when transferred thereto.

Conformation to the ware shape of the deformable head may be brought about by various means. Direct pressure application is perhaps the simplest. However, the application of fluid pressure, either air or liquid, behind the transfer surface may be used. A transfer head which is constructed of a foamed rubber covered with a sheet of silicone rubber as a transfer surface has been found to be operable.

OPERATIVE STEPS

Generally speaking the process of the invention includes the operative steps of

1. Formation of the decalcomania
2. Transfer to the transfer surface
3. Transfer from the transfer surface to the ware.

In its simplest form a mechanism for vertical movement of the transfer head is provided, the design is positioned under the head, the transfer head moved downwardly so that the transfer surface picks up the design from its substrate, the head moved upwardly, the design substrate replaced by a mold, the transfer head moved downwardly, the design transferred from the transfer surface to the ware, the transfer head retracted and the ware with the design in place removed for further processing.

The decalcomania comprises, in its broadest sense, the following structure:

FILM A
DESIGN
FILM B
SUBSTRATE

Broadly speaking, during the transfer process the transfer surface is pressed downwardly on FILM A. When removed, FILM A, the DESIGN, and FILM B is removed by the transfer surface from the decal substrate. When ware is placed under the transfer head and contacted with the decal thereon, FILM B, the DESIGN and FILM A is transferred from the transfer surface to the ware.

The materials of construction are chosen such that the co-efficient of adhesion of FILM B to the substrate of the decal is less than that of FILM A to the transfer surface. Similarly the co-efficient of adhesion of FILM A to the transfer surface is less than that of FILM B to the ware.

Thus the materials of the transfer surface, the decal substrate and of the film layers must be carefully selected to accomplish the desired result. Selection of the film layers of the proper degree of adhesivity to the transfer surface material and to the ware is the essence of the invention.

As was stated above, the novel process of this invention relies upon two film layers in the decalcomania which have differential co-efficients of adhesion; that is to say will adhere to the transfer surface more tightly than to the substrate of the decal, but less tightly than to the surface of the ware being decorated.

One method of achieving this result is by the use of a pair of film layers which surround the decal design layers which are heat activated or sensitized adhesives which have different co-efficients of adhesion at different temperature ranges. For example, using a design structure

FILM A
DESIGN LAYER
FILM B
SUBSTRATE if Film A is an adhesive within a temperature range of from 100°–110°F., and not an adhesive outside that range, and similarly if a Film B is an adhesive within a temperature range of from 150° to 160°F., and not an adhesive outside that range, passing the decalcomania through a temperature range of from 100° to 160° will cause the two film layers to be adhesive at different time intervals coordinating the transfer process with these time intervals will accomplish the desired result.

Set out below is an operative example of one such composition.

EXAMPLE

1. The Substrate Layer

A normal ceramic paper, conventional in the art, was coated with a coating of a wax material which melted at a temperature of about 150° to 160°F. It is to be understood, of course, that other release coated supports or substrates may be used.

There was deposited on the substrate by a silk screening technique, Film B.

2. The Film B.

25 parts by weight of a solution of isopropyl alcohol of an acrylic resin (Carboset 514-A-BF Goodrich) containing 70% solids was mixed with 25 parts by weight of an ethyl cellulose of a rosin resin (Ceramic Medium)-1302-Drakenfeld) containing about 70% solids to the mixture there was added 12 parts by weight of butyl lactate, 12 parts by weight of diacetone alcohol and 6 parts by weight of a hydrocarbon solvent (Solveso 100 - Esso). The mixture was stirred thoroughly and was deposited on the substrate by a silk screening technique.

Film layer B softens and becomes adhesive at about 170°F. and remains adhesive to about 180°F. at which temperature it loses its adhesive quality.

3. The Design Layer.

Deposited upon Film Layer B by a conventional silk screening technique was a design layer of two colors in a conventional ceramic medium. The color layers were formed by admixing the ceramic colors comprising metallic oxides and flux compositions with ethyl cellulose and the usual additives such as plasticizers, solvents and the like.

4. Film Layer A.

A butyl lactate solution containing 40% solids of an acrylic copolymer commercially available from du Pont under the trade name ELVACITE 2046 was deposited over the design layer.

A 40% solids solution in mineral thinner of the acrylic polymer commercially available from Rhom and Haas under the trade name Acryloid F-10 may also be used as Film Layer A.

The Film Layer A softens at about 200°F. and remains an adhesive to about 210°F. at which temperature it loses its adhesive quality.

The decalcomania structure described above was heated to about 220°F., the heated source was removed and Film Layer A, that is the top of the decalcomania, was contacted firmly with a transfer surface which comprises a silicone rubber composition.

When the head transfer surface was removed from contact with the decalcomania, the decalcomania adhered to the surface and was completely removed from the substrate, the wax coating on the substrate having become liquid and Film Layer B being at a temperature above the range at which it was adhesive.

The substrate paper was removed and substituted by a piece of glazed ware 70°F.

The heat transfer surface to which was adhered Film Layer A, the Design Layer, and Film Layer B, was pressed against the ware and the temperature dropped to about 175°F.

At this temperature Film Layer A lost its adhesiveness and Film Layer B became adhesive. Thus when the transfer surface was removed the decalcomania comprising, leading from the ware upwardly, Film Layer B, the Design Layer, and Film Layer A remained adhered to the ware.

The ware was then fired in the conventional ceramic kiln and the design fixed thereto.

There is shown in the accompanying drawing a simplified apparatus which may be utilized for the transfer process of this invention.

Figure 1:
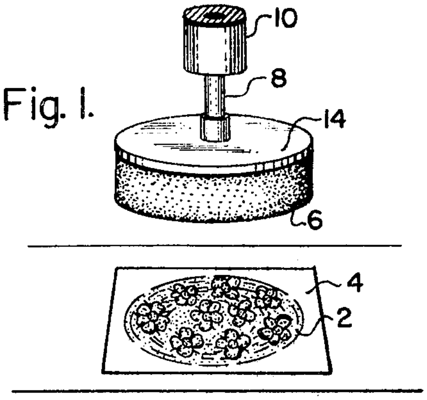
FIGS. 1–6 illustrate the process of this invention graphically.
Figure 2:
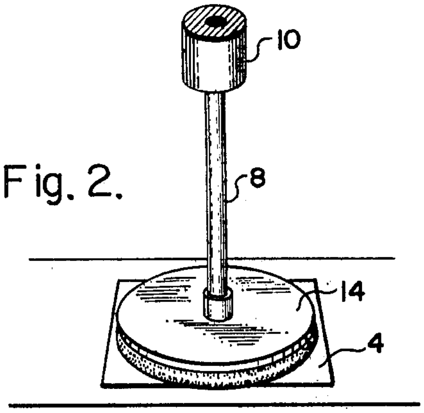
Figure 3:
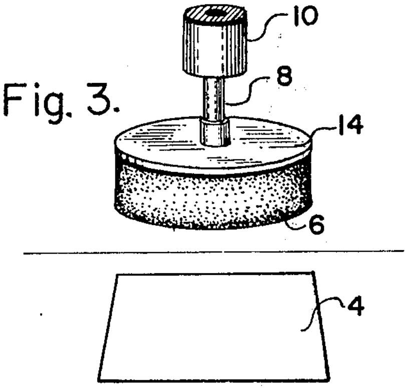

In FIGS. 1–3 the decalcomania 2 is being transferred from its substrate sheet 4 to transfer head 6. The transfer head 6 is attached to shaft 8 fitted in ram 10 so that it may be fitted or restricted by mechanical methods, not shown.

Figure 4:
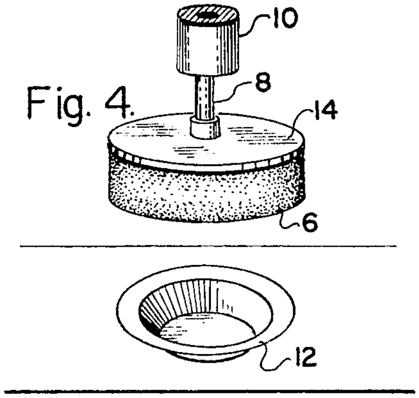
Figure 5:
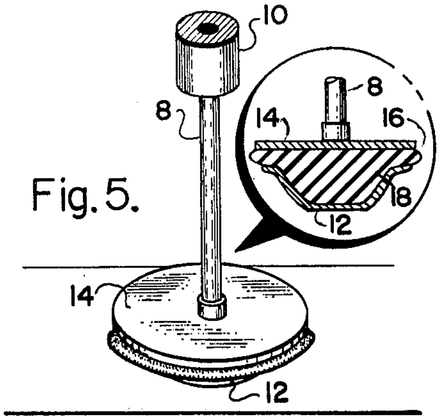
Figure 6:
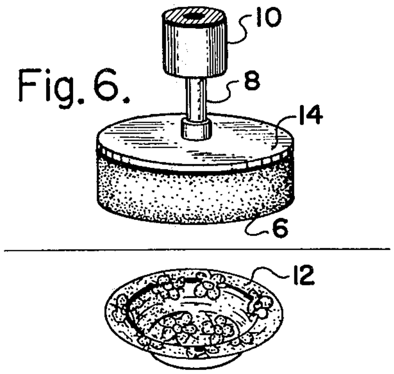

In FIGS. 4–6 a piece of ware 12 has been positioned beneath the transfer head 6 and the decalcomania is transferred to the ware from the transfer head.

In FIG. 5 a cross-sectional view of the transfer head is shown at the point of contact with ware 12. It is seen that the transfer head comprises a plate member 14, a deformable material 16, and a transfer surface 18.

Figure 7:
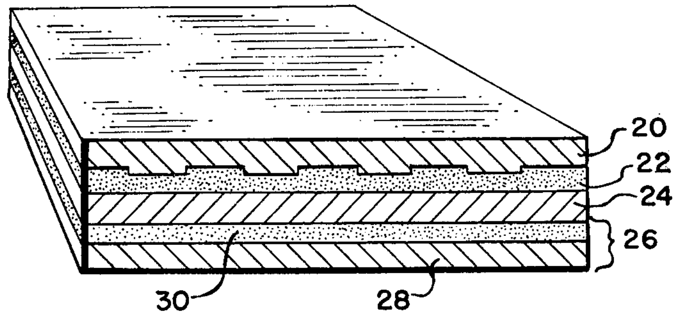
FIG. 7 represents a cross-sectional view of a decalcomania in accordance with the inventive concept.

In FIG. 7 the decalcomania is shown in cross section and comprises a film layer 20, a design layer 22, a film layer 24 and a substrate layer 26, which consists of a conventional ceramic paper 28 and a coating of wax material 30. Film layer 20 represents Film A and film layer 24 Film B as described above.

To summarize briefly, the instant invention relates to a process for the automatic transfer of a printed design from a printed substrate to a ceramic ware by use of a transfer surface on a deformable transfer head. The printed design is also of a unique structure and comprises a Film Layer A, a printed design, a Film Layer B and a substrate therefor. The materials of construction are so chosen that, under conditions of operation, Film Layer A adheres to the transfer surface more strongly than Film Layer B adheres to the substrate and Film Layer B adheres more strongly to the ware than Film Layer A to the transfer surface.

What is claimed is:

1. A decalcomania comprising;

a substrate, a release layer bonded to said substrate, a second adhesive film layer bonded to said release layer, a design layer bonded to said second adhesive film layer, and a first adhesive film layer bonded to said design layer, both of said first and second adhesive film layers being temperature sensitive, so that said first adhesive film layer softens and becomes adhesive when heated to a temperature within a first temperature range and said second adhesive film layer softens and becomes adhesive when heated to a temperature within a second temperature range, said first temperature range is from about 100°F to about 110°F said second temperature range is from about 150°F to about 160°F. both said first and second adhesive film layers being substantially non-adhesive outside of said first and second temperature ranges, respectively.

2. The decalcomania of claim 1 wherein said first temperature range is about 200°F. to 210°F. and said second temperature range is about 170°F. to 180°F.

3. The decalcomania of claim 1 wherein said substrate comprises a paper backing, and said release layer comprises a layer of wax.

* * * * *